US011630938B1

(12) United States Patent
Lorenzini et al.

(10) Patent No.: US 11,630,938 B1
(45) Date of Patent: Apr. 18, 2023

(54) FAILURE MODE ANALYSIS FOR CIRCUIT DESIGN

(71) Applicant: Cadence Design Systems, Inc., San Jose, CA (US)

(72) Inventors: Stefano Lorenzini, Carnate (IT); Antonino Armato, Bergamo (IT)

(73) Assignee: Cadence Design Systems, Inc., San Jose, CA (US)

( * ) Notice: Subject to any disclaimer, the term of this patent is extended or adjusted under 35 U.S.C. 154(b) by 803 days.

(21) Appl. No.: 16/673,792

(22) Filed: Nov. 4, 2019

(51) Int. Cl.
G06F 30/398 (2020.01)
G06F 11/07 (2006.01)
G05B 23/02 (2006.01)
G06F 11/00 (2006.01)
G06F 30/394 (2020.01)
G06F 11/26 (2006.01)

(52) U.S. Cl.
CPC ....... *G06F 30/398* (2020.01); *G05B 23/0216* (2013.01); *G06F 11/006* (2013.01); *G06F 11/0712* (2013.01); *G06F 11/261* (2013.01); *G06F 30/394* (2020.01)

(58) Field of Classification Search
CPC .... G06F 30/398; G06F 30/394; G06F 11/006; G06F 11/0712; G06F 11/261; G05B 23/0216
USPC .......................................................... 703/14
See application file for complete search history.

(56) References Cited

U.S. PATENT DOCUMENTS

| 7,784,019 | B1 |   | 8/2010  | Zach     |                  |
|-----------|----|---|---------|----------|------------------|
| 8,683,400 | B1 | * | 3/2014  | O'Riordan | ...... G06F 30/33 |
|           |    |   |         |          | 716/136          |
| 8,707,269 | B1 | * | 4/2014  | Kondreddy | ...... G05B 23/0216 |
|           |    |   |         |          | 717/125          |
| 8,984,467 | B2 |   | 3/2015  | Arunachalam |               |
| 9,852,258 | B1 | * | 12/2017 | Foster   | ...... G06F 30/398 |
| 10,546,080 | B1 | * | 1/2020  | Ashkenazi | ...... G06F 30/33 |
| 10,643,011 | B1 | * | 5/2020  | Nardi    | ...... G06F 30/3323 |
| 10,853,545 | B1 | * | 12/2020 | Nardi    | ...... G06F 30/30 |
| 10,986,013 | B1 | * | 4/2021  | Theimer  | ...... G06F 11/3466 |
| 11,042,679 | B1 | * | 6/2021  | Tang     | ...... G06F 30/333 |
| 11,288,435 | B1 | * | 3/2022  | Ogushi   | ...... G11C 29/56008 |
| 11,416,662 | B1 | * | 8/2022  | Armato   | ...... G06F 30/327 |
| 2011/0137602 | A1 | * | 6/2011 | Desineni | ...... G06F 30/33 |
|           |    |   |         |          | 702/117          |
| 2012/0079439 | A1 |  | 3/2012 | Akar et al. |              |
| 2015/0040096 | A1 | * | 2/2015 | Chang    | ...... G06F 30/331 |
|           |    |   |         |          | 716/136          |
| 2015/0261906 | A1 |  | 9/2015 | Ramachandran |          |
| 2016/0334467 | A1 | * | 11/2016 | Cho     | ...... G06F 30/00 |

(Continued)

OTHER PUBLICATIONS

U.S. Appl. No. 16/556,751, filed Aug. 30, 2019, Automatic Gate-Level FS Analysis and FMEDA.

(Continued)

*Primary Examiner* — Suresh Memula
(74) *Attorney, Agent, or Firm* — Schwegman Lundberg & Woessner, P.A.

(57) ABSTRACT

Various embodiments provide for failure mode analysis of a circuit design, which can be used as part of electronic design automation (EDA). In particular, some embodiments provide for failure mode analysis of a circuit design by determining a set of functional primitives of a circuit design component (e.g., cell at gate level) that contribute to a root cause logic for a specific failure mode.

20 Claims, 10 Drawing Sheets

(56) References Cited

U.S. PATENT DOCUMENTS

| | | | |
|---|---|---|---|
| 2017/0242952 A1* | 8/2017 | Nanjundappa | G06F 30/398 |
| 2018/0300288 A1* | 10/2018 | Xu | G01R 31/2851 |
| 2021/0042644 A1* | 2/2021 | Blanton | G06N 20/20 |
| 2021/0383052 A1* | 12/2021 | Wu | G11C 29/4401 |
| 2022/0129613 A1* | 4/2022 | Jindal | G06F 30/398 |

OTHER PUBLICATIONS

"U.S. Appl. No. 16/556,751, Response filed Aug. 12, 2020 to Ex Parte Quayle Action mailed May 29, 2020", 11 pgs.

"U.S. Appl. No. 16/556,751, Notice of Allowance dated Aug. 24, 2020", 6 pgs.

"U.S. Appl. No. 16/556,751, Ex Parte Quayle Action mailed May 29, 2020", 6 pgs.

\* cited by examiner

FAILURE MODE ANALYSIS FOR CIRCUIT DESIGN

TECHNICAL FIELD

Embodiments described herein relate to circuit design and, more particularly, to systems, methods, devices, and instructions for failure mode analysis of a circuit design (e.g., a circuit design that is part of a safety critical system), where the failure analysis can be used as part of electronic design automation (EDA).

BACKGROUND

Generally, safety analysis methods have the objective to assess functionality of a system during the design phase and ensure satisfactory safety levels. For example, functional safety is usually a fundamental requirement in the automotive systems that ensures a tolerable level of risk with respect to their operation. To this end, failure mode analysis, such as failure modes and effects and diagnostic analysis (FMEDA), is often used to test how potential failures (represented by failure modes) can affect the functionality of a system. FMEDA represents a key component of functional safety, is a structured quantitative approach to define failure modes, and provides a failure rate and diagnostic capabilities of a hardware component. Failure mode analysis can test a system for functional safety as defined by a safety standard, such as International Electrotechnical Commission (IEC) 61508 for "Functional Safety of Electrical/Electronic/Programmable Electronic Safety-related Systems" and International Organization for Standardization (ISO) 26262 for functional safety of electrical and/or electronic systems in production automobiles. Safety can be measured by metrics calculated by the failure mode analysis (e.g., FMEDA). The accuracy of these metric calculations usually depends on the accuracy of the safety data that the failure mode analysis can characterize for the system being analyzed.

Accurately characterizing safety data for a system can be quite challenging/complex with respect to circuit design (e.g., integrated circuits (ICs)), where often no data sheet with pre-characterized data exists in relation to every potential circuit component included (e.g., integrated) into the circuit design. As a result, safety engineers resort to characterizing ad-hoc safety data for every circuit design (e.g., IC) by trying to identify every individual elementary circuit component responsible of a failure and assign them to the corresponding failure modes. This process can be subjective, inaccurate, manual, or cumbersome, which can lead to unreliable safety data characterization and, therefore, inaccurate metrics calculation.

For instance, inaccurate identification of a circuit component responsible for a specific failure mode can lead to unreliable failure mode distribution calculation (e.g., relative safety importance of a failure mode compared to the total) and unreliable failure mode failure rate calculation (FIT). Additionally, the incorrect identification of a circuit component responsible for a specific failure mode can also lead to an inaccurate functional safety verification, such as inaccurate functional safety validation of the diagnostic coverage (DC) of a safety mechanism designed to detect failures caused by that circuit component. Functional safety verification can be a critical issue of the overall safety flow. For example, ISO 26262 recommends that location (e.g., fault site or root cause) and a number of faults (e.g., fault list) to be injected into a system under a test shall be considered in relationship to the failure mode under verification. Accordingly, the failure mode distribution and failure mode fault list can be two key elements that affect accuracy of safety data computation and safety mechanism verification, especially with respect to certain safety standards (e.g., ISO 26262 and IEC 61508).

BRIEF DESCRIPTION OF THE DRAWINGS

Various ones of the appended drawings merely illustrate various embodiments of the present disclosure and should not be considered as limiting its scope.

DETAILED DESCRIPTION

Figure 1:
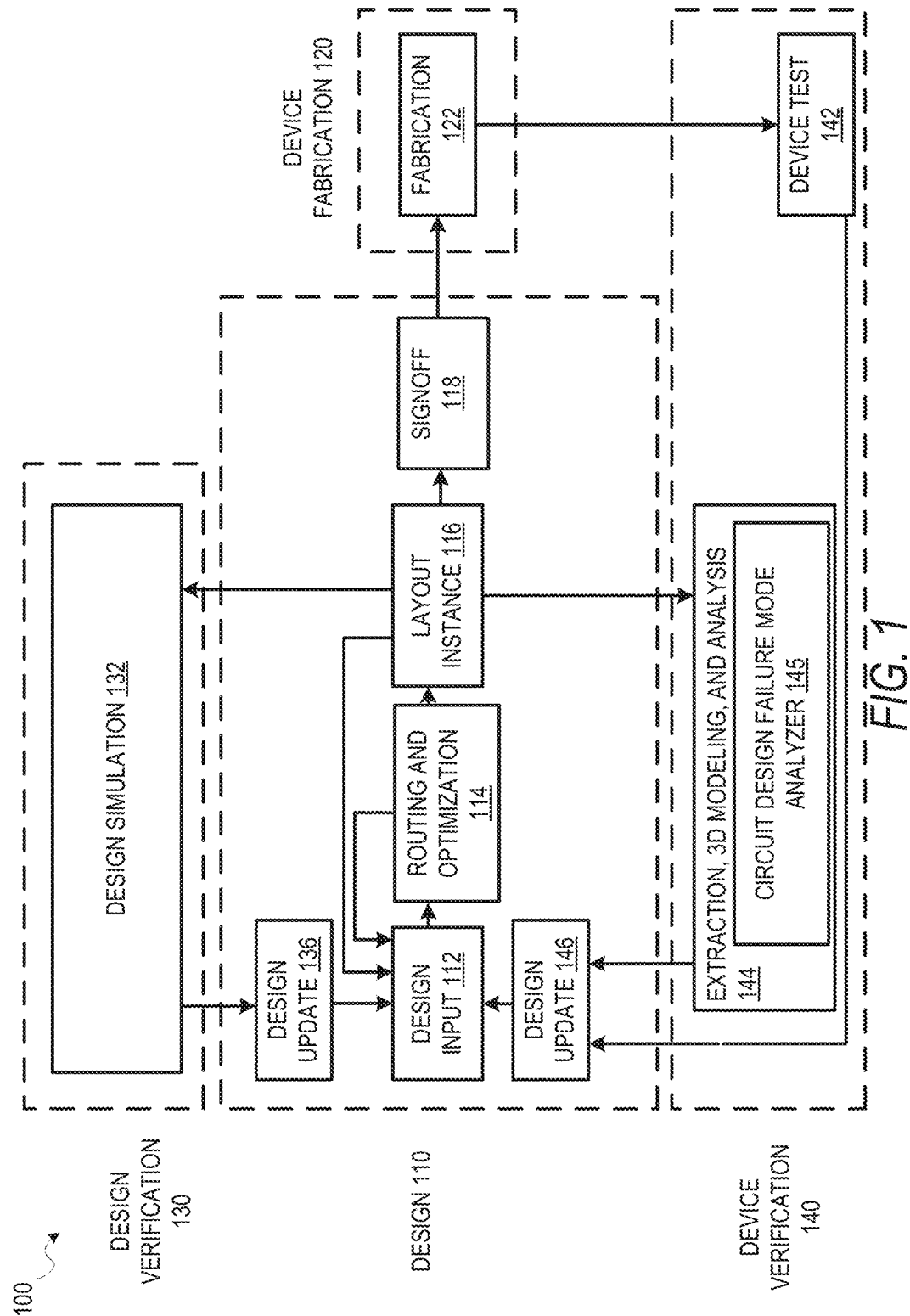
FIG. 1 is a diagram illustrating an example design process flow for failure mode analysis of a circuit design, according to some embodiments.

Various embodiments described herein provide for failure mode analysis of a circuit design, which can be used as part of electronic design automation (EDA). An example of a circuit design analyzed by various embodiments described herein can include one that is part of a safety critical system, such as one used in a vehicle (e.g., automobile or aircraft). In particular, some embodiments described herein provide for failure mode analysis of a circuit design by determining (e.g., identifying, extracting, separating) a set of functional primitives of a circuit design component (e.g., set of cells of the circuit design component at gate level) that contribute to a root cause logic for a specific failure mode. In this way, such embodiments can provide or enable an accurate quantification and verification for the failure mode analysis (e.g., FMEDA), and can provide or enable an effective way to map (e.g., associate) one or more failure modes to the circuit design component. For instance, some embodiments use a circuit design sub-component (e.g., elementary functions per FMEDA hierarchy or a safety standard) to represent a root cause to be associated to one or more specific failure modes. With respect to a given circuit design component, the accuracy of determining the set of functional primitives can govern the accuracy of a failure mode distribution calculation (e.g., of the FMEDA) for the given circuit design component and the accuracy of a fault list for the given circuit design component, each of which can be used during a safety verification process (e.g., one that measures the diagnostic coverage (DC) property of a safety critical system).

Some embodiments described herein provide or enable failure mode analysis that has selective granularity based on selection (e.g., user selection) of one or more end points with respect to a functional portion of a circuit design. For some embodiments, the selective granularity used to separate a root cause from one or more failure modes can be adapted by a user (e.g., safety engineer) according to an accuracy level (e.g., FMEDA accuracy level) desired. In doing so, such embodiments can provide for a failure mode analysis flow that has flexible granularity to increase the accuracy in the connection between the root causes (e.g., different root cause logic portions) and failure modes in the context of the specific safety problems. Some embodiments described herein provide or enable failure mode analysis that allows a user to accurately map functional primitives (e.g., cells or gates at gate level) to one or more failure modes, and to do with a desired level of granularity. Additionally, some embodiments described herein provide or enable failure mode analysis that automatically calculates, for a circuit design, safety data used to determine (e.g., generate) one or more failure mode distribution calculations and to determine (e.g., generate) one or more failure mode faults lists, both of which can be used when performing fault injection simulations with respect to the circuit design. By enabling accurate mapping between root causes and failure modes, various embodiments can improve correct computation of safety data for a circuit design and correct computation of the overall safety metrics of the circuit design.

By use of various embodiments described herein, a computing device can formally capture connections between functional portions of a circuit design, and the failure modes can accurately compute the failure mode distributions and, as a result, can enable a computing device to correctly compute overall safety metrics for a circuit design. Additionally, through various embodiments described herein, safety data characterization can be applied to a circuit design within an EDA tool, which can provide accurate systematic methods and effective management of safety data. In this way, various embodiments can automatically manage circuit design data in a fine-grained manner, thereby reducing or minimizing the error impact on failure mode distribution and safety data in general for a circuit design. This can result in improved safety verification efforts with respect to a circuit design. The method of some embodiments provides a separation process (e.g., root cause logic-to-failure mode separation process) that can reduce or obviate the need for circuit design reverse engineering. By isolating root causes of circuit design sub-components triggering failure modes, various embodiments can provide consistency between generated fault lists and the functional portions of the circuit design expected to be covered by a safety analysis method, which in turn reduces safety mechanism overhead.

Some embodiments described herein can support development of a system-on-chip (SoC), such as one used in a system that is safety-critical and/or demands high reliability. Some embodiments described herein can, for instance, be useful in verification certain safety critical systems, such as those used in automotive applications. Additionally, use of various embodiments described herein can permit for adoption of the proper level of mapping granularity (e.g., root cause logic-to-fault-mode mapping granularity) according to a desired accuracy (e.g., FMEDA accuracy) defined by a standard (e.g., safety standard, such as ISO 26262 and IEC 61508).

As used herein, a functional primitive can form part of a functional sub-portion of a circuit design. An example functional primitive can comprise, for example, a cell of a circuit design, or a variable representing a logic of a circuit design (e.g., variable represents an instance within the circuit design) that will have a corresponding implementation (e.g., cells at gate level) in the circuit design after synthesis. For instance, at a gate level of abstraction of a circuit design, the functional primitives can comprise cells of a circuit design, such as gates or flip-flops. The extraction of such functional primitives can comprise a list of cells, and the characterization of such functional primitives can comprise, for example, area of those cells. In another instance, at a programming code level (e.g., SystemC, C, RTL. etc.) of abstraction of a circuit design, the functional primitives can comprise variables that represent logic of the circuit design. For example, the functional primitive can comprise c=a +b, where the variable "c" represents an adder, and where variables "a" and "b" represent logic in front to the adder that generates its inputs. The extraction of such functional primitives can comprise a list of variables, and the characterization of such functional primitives can comprise, for example, approximation of the area of the circuit design that the synthesis will generate from those variables (e.g., an algorithm will provide estimations without synthetizing the code). According to some embodiments, the context (e.g., the abstraction level currently being used) of a circuit design determines the granularity of functional primitives (e.g., whether the functional primitives comprise cells or variables) used for analyzing the failure mode analysis of a circuit design as described herein.

As used herein, a failure mode can comprise a textual sentence representing a way in which a function (e.g., functional portion or elementary function) of a circuit design might fail when exposed to a fault (e.g., gate fault). For example, with respect to a specific failure mode (e.g., failure mode #2), an example textual sentence can specify the specific functional portion of the circuit design (e.g., "the adder" of the circuit design) that activates the specific failure mode, and can specify the effect caused by the specific functional portion failing (e.g., "wrong data caused"). For instance, the textual sentence for an example failure mode #2 can comprise "wrong data caused by fault in the adder." As used herein, a root cause logic can refer to a specific functional portion of a circuit design that activates one or more failure modes. A given circuit design component (e.g., instance or block of a circuit design) can have multiple root causes that trigger multiple (different) failure modes. For various embodiments described herein, a given root cause logic can determine safety data used during failure mode analysis verification (e.g., FMEDA verification), such as safety data that comprises a failure mode distribution value or a fault list for a given failure mode.

As used herein, a functional portion of a circuit design can comprise a component of a circuit design, such as an instance or a block of the circuit design. A functional sub-portion of a circuit design can comprise a function (e.g., elementary function) of a functional portion of the circuit design, such as a gate, a flip-flop, or another instance (internal to the functional portion). Logic within a functional portion that is not covered by a functional sub-portion (e.g., elementary function) can be regarded as/referred to herein as sparse logic. As used herein, an elementary function can represent an elementary subpart according to a FMEDA hierarchy or a safety standard (e.g., ISO 26262). For various embodiments described herein, a functional sub-portion can be defined by one or more functional end points (also referred herein as "end points") defined with respect to (e.g., within) a functional portion of the circuit design. The functional portion being separated into functional sub-portions can have one or more failure modes already mapped to it. Additionally, the granularity of the functional sub-portion of a circuit design can be selectively determined by the one or more end points. For instance, an end point can be defined (e.g., set) by a user (e.g., via a script or a graphical user interface (GUI)) with respect to a functional portion of a circuit design. For example, a user can use a tool command or a pragma embedded into the circuit design code to define one or more end points with respect to a functional portion of a circuit design, and an embodiment described herein can automatically aggregates a set of functional primitives (e.g., all gates) affecting the one or more end-points.

As used herein, an end point defined with respect to a functional portion of a circuit design can comprise a signal defined in language (e.g., C programming language, SystemC, or hardware description language (HDL)) describing the functional portion of the circuit design, a variable defined in language describing the functional portion of the circuit design, a pin (e.g., input pin, output pin) of the functional portion of the circuit design, or a flip-flop of the functional portion of the circuit design. With respect to a functional portion (e.g., instance or block) of a circuit design, an end point can be defined according to architectural information of the circuit design, thereby enabling various embodiments to be applicable to any design abstraction level (e.g., C, SystemC, HDL, register transfer level (RTL), gate level (GL) netlist, etc.) where the architectural information is available. For instance, a given end point can comprise a variable or a signal (e.g., variable defined in C, or signal defined in SystemC), where mappings are done with respect to the variable/signal at a software code level of abstraction. During a design flow, those variables/signals can be preserved and traced to (for example) the RTL and GL level, where the variables/signals become (for instance) pins, a flip-flops (e.g., registers), or outputs of combination logic. Accordingly, for some embodiments, failure mode mapping performed for a circuit design at a higher level of design abstraction (e.g., at the SystemC level) can be reused for the circuit design when moving to lower levels of design abstraction (e.g., at RTL or GL).

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagram illustrating an example design process flow 100 for failure mode analysis of a circuit design, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. Though not shown, the routing and optimization 114 operation can include a clock tree synthesis (CTS) operation, which can generate one or more clock trees that deliver clock signal from clock sources of a circuit design to a plurality of clock tree leaf nodes comprising clock tree pins (e.g., of circuit devices, such as flip-flops) within the circuit design. The routing and optimization 114 operation may also include other operations not shown, such as those relating to floor planning, placement, post-placement optimization, and post-routing optimization.

While the design process flow 100 shows optimization occurring prior to a layout instance 116, timing analysis and optimization may be performed at any time to verify operation of a circuit design. For instance, in various embodiments, timing analysis in a circuit design may be performed prior to the routing of connections in the circuit design, after routing, during register transfer level (RTL) operations, or as part of a signoff 118, as described below.

Design inputs are used in the design input 112 operation to generate an initial circuit layout. The design inputs may be further processed during the design input 112 operation via a process, such as logic-synthesis to generate a circuit netlist mapped to a target standard library manufacturable by the foundry in fabrication 122 operation. After design inputs are used in the design input 112 operation to generate an initial circuit layout, and any of the routing and optimization 114 operations are performed, a resulting layout is generated as the layout instance 116. The netlist as placed by the layout instance 116 describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

As described in more detail below, a design update 136 from the design simulation 132; a design update 146 from the device test 142 or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

As shown, the extraction, 3D modeling, and analysis 144 operation includes an operation 145 for failure mode analysis of a circuit design, which may be performed in accordance with various embodiments described herein. When the circuit design is available (e.g., either at RTL-level, gate-level, or as a schematic), operation 145 can be performed on the circuit design. Operation 145 can enable a quantitative failure mode analysis (e.g., FMEDA) to be performed on the circuit design, which can predict a failure mode distribution (FMD) and a failure rate for the circuit design. For some embodiments, operation 145 can: separate (with selective granularity) a functional portion (e.g., component) of a circuit design into one or more functional sub-portions (e.g., sub-components, elementary functions); generate characterization data for the one or more functional sub-portions; generate fault list (e.g., failure mode fault list) data for the one or more functional sub-portions; and facilitate mapping between the one or more functional sub-portions and one or more failure modes. By way of operation 145, various embodiments can use the generated characterization data to accurately calculate failure rates and to accurately generate a fault list. Additionally, by way of operation 145, a user (e.g., safety engineer) can define elementary functions of a circuit design component (e.g., instance or block) with selective granularity (e.g., based on user defined (e.g., set) end points within the circuit design component). Operation 145 can further provide a user with tunable mapping granularity to achieve a desired safety analysis accuracy at the minimum user effort. More regarding how operation 145 can be performed is described below with respect to the other figures.

Figure 2:
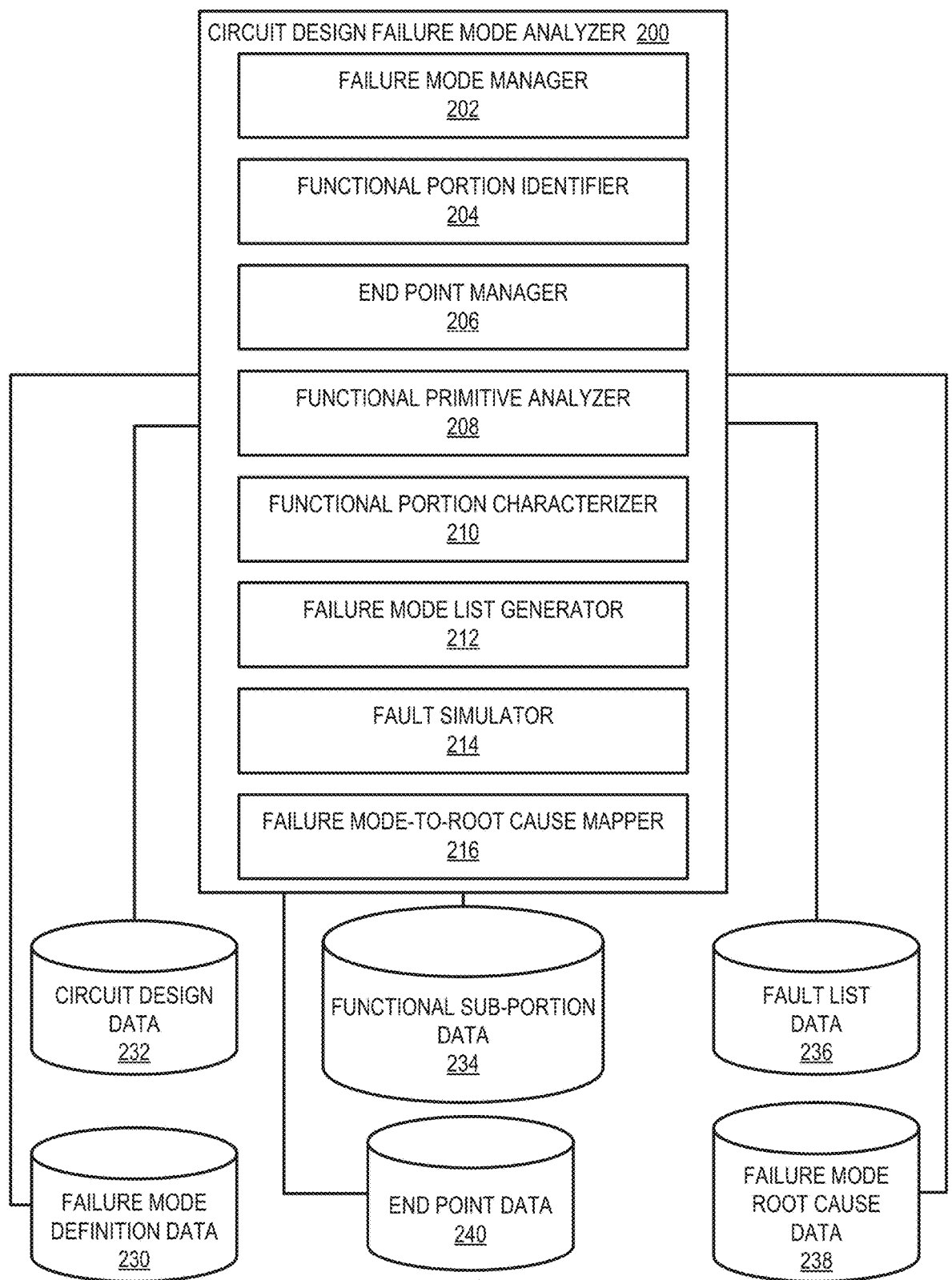
FIG. 2 is a block diagram illustrating an example circuit design failure mode analyzer for performing failure mode analysis, according to some embodiments.

FIG. 2 is a block diagram illustrating an example circuit design failure mode analyzer 200 for performing failure mode analysis, according to some embodiments. For some embodiments, the circuit design failure mode analyzer 200 facilitates performance of operation 145 as described above with respect to FIG. 1. As shown, the circuit design failure mode analyzer 200 comprises a failure mode manager 202, a functional portion identifier 204, an end point manager 206, a functional primitive analyzer 208, a functional portion characterizer 210, a failure mode list generator 212, a fault simulator 214, and a failure mode-to-root cause mapper 216. As also shown, the circuit design failure mode analyzer 200 is operatively coupled (or otherwise has access) to failure mode definition data 230, circuit design data 232, functional sub-portion data 234, fault list data 236, failure mode root cause data 238, and end point data 240. Each of 230, 232, 234, 236, 238, 240 can represent data stored on one or more individual datastores or databases. For various embodiments, the components and arrangement of components may vary from what is illustrated in FIG. 2. For instance, the circuit design failure mode analyzer 200 can include more or fewer components than the components shown in the FIG. 2. Any components of the circuit design failure mode analyzer 200 can be implemented using one or more processors (e.g., by configuring such one or more computer processors to perform functions described for that component) and hence can include one or more of the processors. Furthermore, according to various embodiments, any of the components illustrated in FIG. 2 can be implemented together or separately within a single machine, database, or device or may be distributed across multiple machines, databases, or devices.

The failure mode manager 202 can access and manage one or more failure mode definitions with respect to a circuit design. As described herein, a failure mode comprises a textual sentence representing a way in which a functional portion or a functional sub-portion might fail when exposed to a fault. For instance, a user can add or remove a failure mode definition with respect to a given circuit design. A failure mode definition can be associated with a functional portion of a circuit design or a functional sub-portion of the circuit design. The failure mode definition data 230 can be used to store one or more failure mode definitions with respect to a circuit design and, accordingly, the failure mode definition data 230 can be updated in response to the addition, removal or modification of a failure mode definition through the failure mode manager 202.

The functional portion identifier 204 can determine (e.g., identify) a functional sub-portion (e.g., elementary function) of a given functional portion (of a circuit design) based one or more end points defined with respect to the given functional portion. The functional portion identifier 204 can determine a functional sub-portion based on data (from the circuit design data 232) for the circuit design. The circuit design data 232 can comprise, for example, architectural information (e.g., hierarchical information) for a circuit design, a list of instances (e.g., flip-flops) of a circuit design, areas of instances of a circuit design, number of flip-flops of a circuit design, a list of pins for a circuit design, a gate-level netlist for a circuit design, and cell library data.

As described herein, an end point can be defined (e.g., set) by a user (e.g., safety engineer) and can identify where one or more functional sub-portions (e.g., elementary functions) terminate. To start mapping (e.g., assigning) different functional sub-portions of a circuit design to different failure modes (e.g., defined in the failure mode definition data 230), a user can first select a functional portion (e.g., instance) of a circuit design as the current functional portion (e.g., current instance) to be divide into one or more functional sub-portions (e.g., elementary functions). To select the current functional portion, the user may recognize they have a failure mode (e.g., "Wrong value due to fault in counter") and that the current functional portion (e.g., counter in the circuit design) is a root cause of the failure mode (e.g., responsible for activating the failure mode when the current functional portion is failing). In the circuit design, the counter can be presented by a variable at the RTL level, and a user can define (e.g., through a tool of an embodiment) an end point with respect to the variable for the counter. Subsequently, based on one or more end points defined with respect to the current functional portion, the functional portion identifier 204 can determine one or more functional sub-portions of the current functional portion. By dividing the current functional portion into one or more functional sub-portions, a user can determine (e.g., identify) a given functional sub-portion as a root cause logic responsible for triggering one or more failure modes.

For some embodiments, the functional portion identifier 204 determines a functional sub-portion by performing a fan-in operation from one end point (e.g., defined/set by a user) back to one or more other end points (e.g., defined/set by the user) or one or more inputs of a current functional portion (e.g., current instance). For instance, the fan-in operation can backtrack paths starting from an output pin or a Q output of a flip-flop, and can stop backtracking when the operation reaches another end point or when the operation reaches an input of the current functional portion. If the fan-in operation is configured to flatten instances, the fan-in backtracking path can include all internal instances (of the current functional portion) in the paths. If otherwise, the fan-in backtracking path can stop on an output of an internal instance of the current functional portion. The fan-in operation can receive, as input parameters, the identity of the current functional portion (e.g., current instance) and a set of end points defined for the current functional portion. The fan-in operation can construct a functional sub-portion (e.g., elementary function) in front of the set of end points.

The end point manager 206 can manage definition of one or more end points with respect to a functional portion of a circuit design. Depending on the embodiment, a user can define an end point by way of a command, graphical user interface (GUI), or script, which may be part of an EDA tool. For instance, with respect to a schematic of a circuit design presented in a GUI, through the GUI, a user can select one or more end points with respect to a functional portion of the circuit design. A defined end point can be stored as an end point setting. The definition or setting of an end point can be stored as part of the end point data 240. As described herein, defining one or more end points with respect to a functional portion of a circuit design can determine the granularity by which the functional portion is divided for failure mode analysis, such as generation of characterization data and failure mode lists for functional sub-portions. An end point can include, for example, a pin or an internal flip-flop, which can be selected using design information (e.g., from the circuit design data 232).

The functional primitive analyzer 208 can determine a set of functional primitives (e.g., cells or gates) for a functional sub-portion (e.g., elementary function) determined by the functional portion identifier 204 based on design information (e.g., from the circuit design data 232). For some embodiments, a list of functional primitives (e.g., list of cells) is extracted from a given functional sub-portion (e.g., elementary function) based on a cone of influence defined by an end point (e.g., defined/set by the user) and other end points (e.g., defined/set by the user) or one or more inputs of a current functional portion.

The functional portion characterizer 210 can generate characterization data for a functional sub-portion (e.g., elementary function), determined by the functional portion identifier 204, based on the set of functional primitives determined for the functional sub-portion by the functional primitive analyzer 208. For some embodiments, the characterization data comprises, without limitation, gate area and number of flip-flops for the functional sub-portion. The characterization data can be stored for the functional sub-portion as part of the functional sub-portion data 234. The functional sub-portion data 234 can comprise a database for functional sub-portions determined (e.g., identified) by the functional portion identifier 204. For some embodiments, the characterization data can be used to calculate permanent and transient safety data of for a functional sub-portion (e.g., elementary function) according to failure rate (e.g., elementary base failure rate). The safety data (e.g., failure rates of failure modes) calculated based on the characterization data can be stored as part of the functional sub-portion data 234.

Based on the characterization data generated by the functional portion characterizer 210, some embodiments can determine a safety metric calculation for at least the functional portion based on the characterization data, such as a failure mode distribution (FMD). The failure mode distribution can normalize the weight of a given failure mode of a given functional portion compared to other failure modes of the given functional portion. An example failure mode distribution can comprise a ratio between the gates that are associated with a specific failure mode (through a mapping to a specific functional sub-portion) divided by total numbers of gates of the functional portion containing the functional sub-portion. Accordingly, mapping of functional sub-portions (e.g., elementary functions) to failure modes will drive the failure mode distribution. For instance, where a functional sub-portion (e.g., an elementary function) F1 has 200 gates, and F1 is mapped to failure mode #1, then the failure mode #1 has 200 gates. Accordingly, where the functional portion has 1000 gates, failure mode #1 has 200 gates and a weight of 20, failure mode #2 has 300 gates has a weight of 30, and failure mode #3 has 500 gates has a weight of 50. It will be understood that since a user (e.g., safety engineer) can assign gates to different root causes, the sum of the weight could be greater than 1000 gates.

The failure mode distribution (FMD) can be calculated in such a manner that the sum of the failure mode distribution into a functional sub-portion (e.g., sub-part) is always 100% regardless of the mapping. Accordingly, where the functional sub-portion comprises 1000 gates, failure mode #1 weight is 200, failure mode #2 weight is 500, and failure mode #3 weight is 400, the failure mode distribution can be calculated as follows: failure mode #1 distribution (FMD1)=200/(200+500+400)=18.2%, failure mode #2 distribution (FMD2)=500/(200+500+400)=45.5%, and failure mode #3 distribution (FMD3)=400/(200+500+400)=36.4%. Assuming the functional sub-portion has a failure rate of 0.5FIT (number of gates multiplied by the FIT of an equivalent NAND2 gate), then the failure mode (FM) safety data (e.g., the failure rates) can be calculated as failure mode #1 failure rate=0.5FIT*18.2%=0.091 FIT. Failure rates for failure modes #2 and #3 can be calculated in a similar manner. In this way, various embodiments can use generated characterization data to accurately determine failure mode distribution and failure rates. In particular, this methodology can provide accuracy to determining root cause weight in order to accurately calculate failure mode (FM) failure rates (e.g., to be used as safety data). As noted herein, the safety data and the fault list can be two results of various embodiments described herein.

The failure mode list generator 212 can determine a failure mode fault list for a functional sub-portion (e.g., elementary function), determined by the functional portion identifier 204, based on the set of functional primitives determined for the functional sub-portion by the functional primitive analyzer 208. For some embodiments, the more accurate the set of functional primitives, the more accurate the failure mode fault list generated. A failure mode fault list of a functional sub-portion can comprise a list of signals for functional primitives determined by the functional primitive analyzer 208. A signal from the list of signals can be injected (e.g., by a fault injector of fault simulator 214) to trigger a failure mode with respect to the functional sub-portion. The fault list can also enable formal analysis of a functional sub-portion. For some embodiments, the more accurate the failure mode fault list, the more accurate the fault injection process. The failure mode fault list determined by the failure mode list generator 212 can be stored as part of the fault list data 236.

The fault simulator 214 can perform a fault simulation on at least part of a circuit design (e.g., functional sub-portion) based on the characterization data generated by the functional portion characterizer 210 or a fault list determined by the failure mode list generator 212.

The failure mode-to-root cause mapper 216 can enable a user to map one or more functional portions or functional sub-portions (as root causes) to one or more failure modes defined in the failure mode definition data 230. During failure mode analysis workflow, a user can map a functional portion (e.g., instance or block) of a circuit design to a given failure mode, separate the function portion into one or more functional sub-portions based on one or more user-defined end points, and then map the one or more functional sub-portions to one or more additional failure modes defined by the user. The user-defined mappings can be facilitated through the failure mode-to-root cause mapper 216, and each mapping can generate mapping data. The user mappings created can be stored as part of the failure mode root cause data 238.

Figure 3:
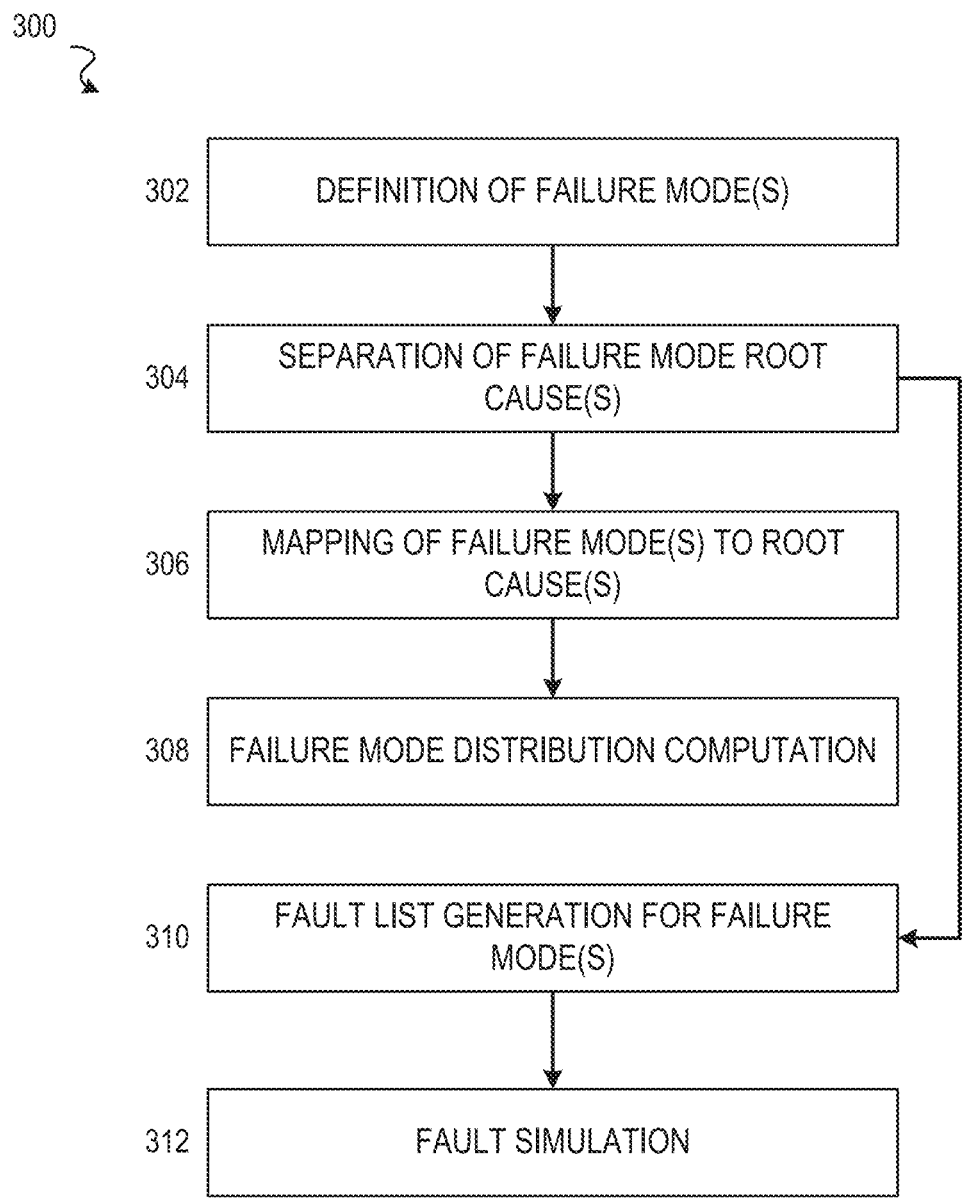
FIG. 3 is a flow chart illustrating an example method for failure mode analysis, according to some embodiments.

FIG. 3 is a flow chart illustrating an example method 300 for failure mode analysis, according to some embodiments. For some embodiments, the method 300 represents a general dataflow for performing failure mode analysis. At operation 302, definition of one or more failure modes is accessed (e.g., from a failure mode definition datastore). As described herein, the failure mode definitions accessed can be for failure modes defined by a user.

At operation 304, for a selected (e.g., user selected) functional portion of a circuit design (e.g., instance or block of the circuit design), a set of functional primitives is determined for each functional sub-portion (e.g., elementary function) of the selected functional portion, where each functional sub-portion represents a root cause logic that can be mapped to one or more other failure modes defined by the failure mode definitions.

Depending on the embodiment, operation 304 can involve a user identifying of a given functional portion (e.g., instance or block) as the root cause logic for a given failure mode. The user can generate a mapping between the given functional portion and the given failure mode accordingly. Operation 304 can then access end point data (e.g., end point settings) that defines one or more end points with respect to the given functional portion. These end points can be user defined and determine the granularity with which the given functional portion is divided for failure mode analysis. Based on the defined end points, operation 304 can divide the selected functional portion (e.g., instance or block) into one or more functional sub-portions (e.g., elementary functions). Operation 304 can further determine (e.g., identify) a set of functional primitives (e.g., cells or gates) for each functional sub-portion determined (e.g., identified). As described herein, determining the set of functional primitives for each functional sub-portion can permit an accurate quantification and verification of the failure mode analysis (e.g., FMEDA).

At operation 306, one or more functional sub-portions (determined by operation 304) are mapped (as root cause logic) to failure modes based on the set of functional primitives determined for each functional sub-portion by operation 304. At operation 308, failure mode distributions are computed based on the mapping of functional sub-portions to failure modes and based on the set of functional primitives determined for each functional sub-portion by operation 304. Though not illustrated, characterization data (e.g., gate area and flip-flop) can be generated for each functional sub-portion based on their respective set of functional primitives as determined by operation 304. The characterization data can be useful in calculating other safety metrics with respect to the functional portion (selected during operation 304).

At operation 310, a failure mode fault list is generated for each functional sub-portion (determined by operation 304) based on their respective set of functional primitives as determined by operation 304. As described herein, the failure mode fault list for a given functional sub-portion can comprise a set of signals for triggering a failure mode/fault with respect to the given functional sub-portion. Based on the failure mode fault list(s) generated by operation 310, at operation 312, a fault simulation is performed on at least the functional portion selected for separation during operation 304. For instance, a fault injector of a fault simulator can use the failure mode fault list of a given functional sub-portion to inject failure modes/faults with respect to at least the given functional sub-portion.

Figure 4:
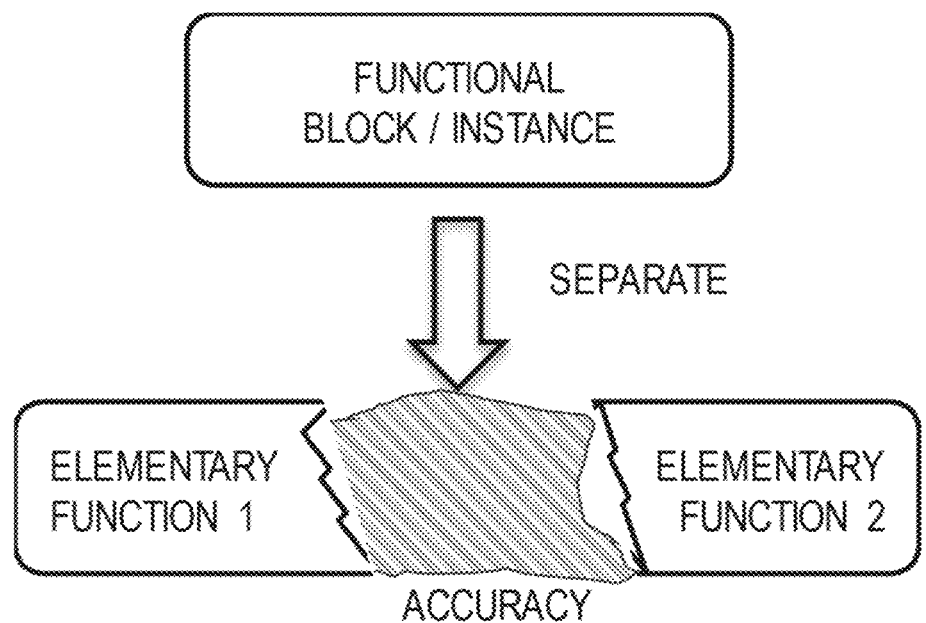
FIG. 4 is a block diagram illustrating how an example functional portion is divided into multiple functional sub-portions, according to some embodiments.

FIG. 4 is a block diagram illustrating how an example functional portion is divided into multiple functional sub-portions, according to some embodiments. In particular, a functional block/instance is illustrated as being separated (e.g., partitioned) into an elementary function 1 and an elementary function 2, which can define the accuracy with which failure mode analysis can be performed with respect to the functional block/instance. As described herein, separating the functional block/instance into elementary functions can increase the accuracy with which failure mode analysis can be performed and have an impact on verification and safety metric computation with respect to the functional block/instance.

Figure 5A:
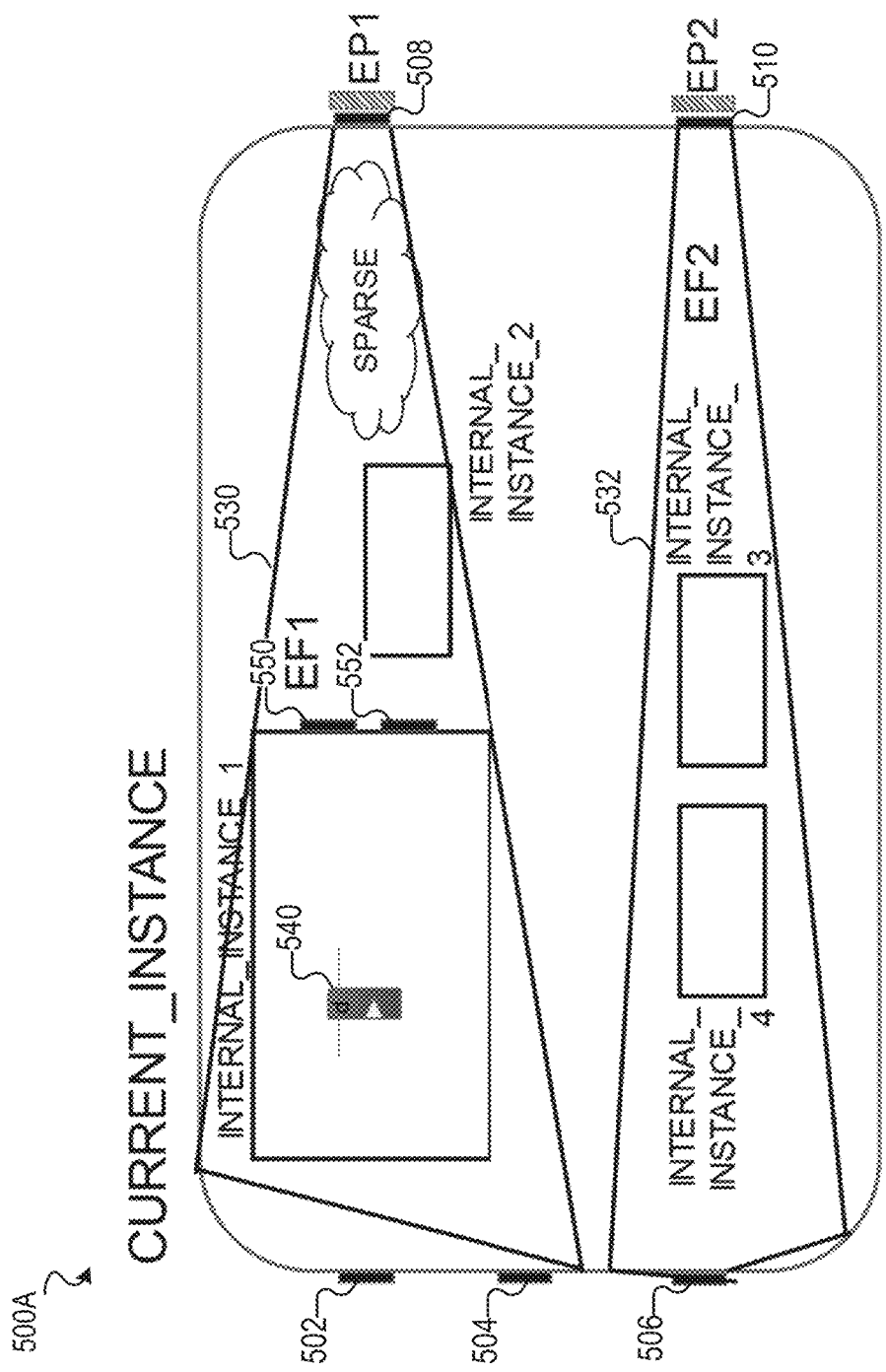
FIGS. 5A and 5B are diagrams illustrating an example functional operation defined with a set of end points, according to some embodiments.
Figure 5B:
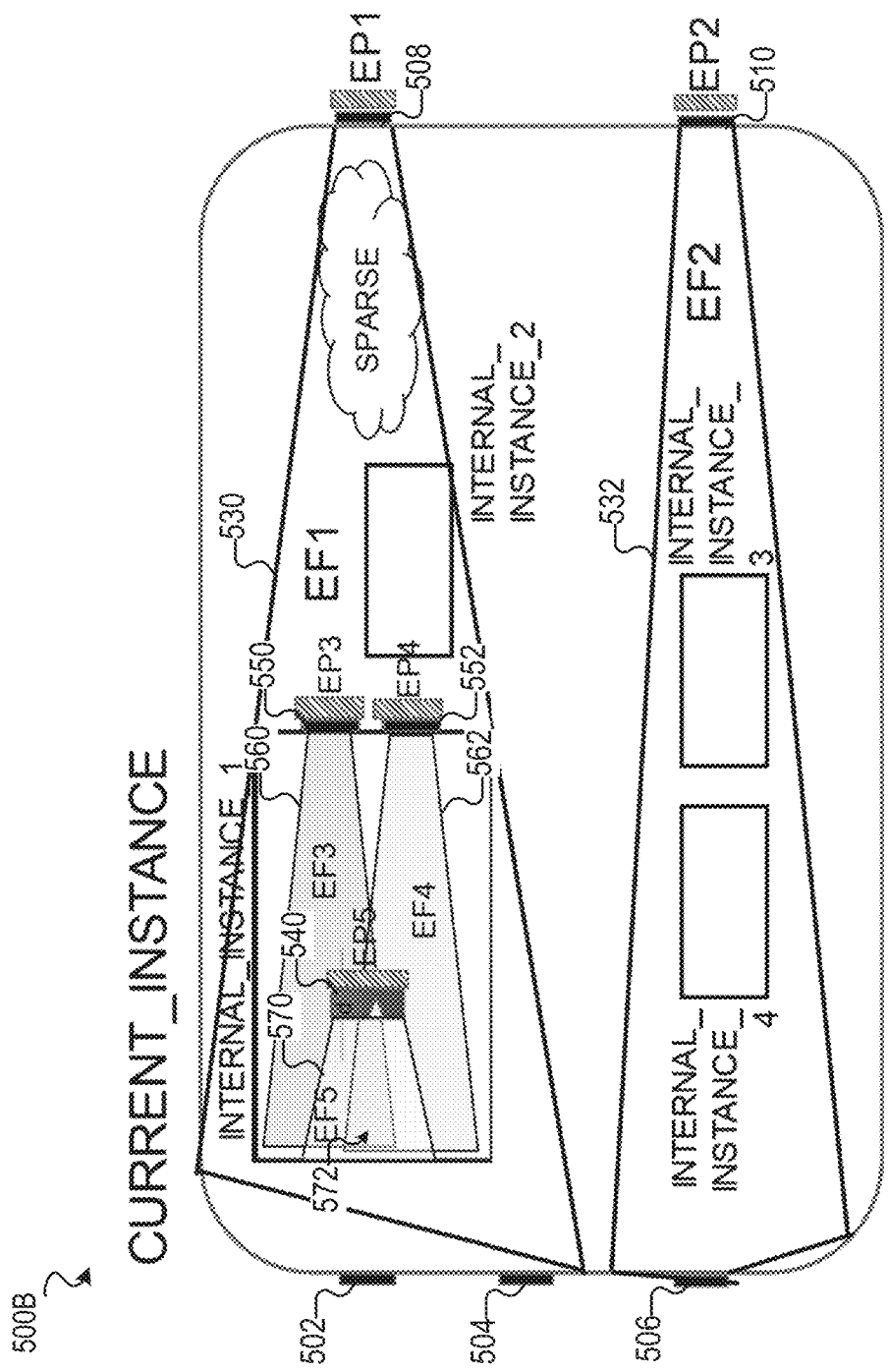

FIGS. 5A and 5B are diagrams illustrating an example functional operation defined with a set of end points, according to some embodiments. In particular, both FIG. 5A and FIG. 5B illustrate different perspective of a current instance 500 of a circuit design. The current instance 500A of FIG. 5A illustrates where internal instances are flattened with respect to an elementary function, and so the fan-in operation for constructing EF1 and EF2 includes the overall logic of internal instances (e.g., EF1 includes internal instance 1 and internal instance 2). In contrast, the current instance 500B of FIG. 5B illustrates where internal instances are not flattened with respect to an elementary function, and so the fan-in operation for constructing EF1 and EF2 avoids going inside internal instances. The current instance 500 includes: output pins 502, 504, 506; input pins 508, 510; internal instance 1; internal instance 2; internal instance 3; and internal instance 4. As also shown, internal instance 1 includes a flip-flop 540 and input pins 550 and 552.

As also shown with respect to current instance 500A of FIG. 5A, an end point 1 (EP1) is defined with respect to input pin 508, and an end point 2 (EP2) is defined with respect to input pin 510. According to some embodiments, an elementary function 1 (EF1) is determined (e.g., identified) based on EP1, where a cone-of-influence 530 of EF1 spans from EP1 (at input 508) to output pins 502 and 504 of the current instance. Likewise, according to some embodiments, elementary function 2 (EF2) is determined (e.g., identified) based on EP2, where a cone-of-influence 532 of EF2 spans from EP2 (at input 510) to output pin 506 of the current instance. As internal instance 1 is flattened (e.g., based on a user-selected option) in FIG. 5A, the logic of internal instance 1 is included by the cone-of-influence 530 of EF1. As described herein, a cone-of-influence for a particular elementary function (EF) can determine a set of functional primitives (e.g., cells) associated with the particular EF.

The following Table 1 illustrates example mappings between elementary functions (EF1 and EF2) and failure modes (FM1 and FM2) for the current instance 500A.

TABLE 1

| Failure Modes | Targets |
|---|---|
| FM1 | EF1 |
| FM2 | EF2 |

As also shown with respect to current instance 500B of FIG. 5B, an end point 1 (EP1) is defined with respect to input pin 508, and an end point 2 (EP2) is defined with respect to input pin 510. Additionally, an end point 3 (EP3) is defined with respect to input pin 550, an end point 4 (EP4) is defined with respect to input pin 552, and an end point 5 (EP5) is defined with respect to an input of the flip-flop 540. Accordingly, EF1 is determined based on EP1, where the cone-of-influence 530 of EF1 spans from EP1 (at input 508) to output pins 502 and 504 of the current instance and to EP3 and EP4 at input pins 550 and 552. EF2 is determined based on EP2, where the cone-of-influence 532 of EF2 spans from EP2 (at input 510) to output pin 506 of the current instance. Within internal instance 1, elementary function 3 (EF3) is determined based on EP3, where a cone-of-influence 560 of EF3 spans from EP3 (at input 550) to EP5 at the input of the flip-flop 540 and to the end of the internal instance 1. Within internal instance 1, elementary function 4 (EF4) is determined based on EP4, where a cone-of-influence 562 of EF4 spans from EP4 (at input 552) to EP 5 at the input of the flip-flop 540 and to the end of the internal instance 1. Additionally, within internal instance 1, elementary function 5 (EF5) is determined based on EP5, where a cone-of-influence 570 of EF5 spans from EP5 (at the input of the flip-flop 540) to the end of the internal instance 1. As shown, the cone-of-influences 560, 562, 570 overlap at 572, which indicates that functional primitives (e.g., cells) that fall within 572 can be shared by EF3, EF4, EF5. As internal instance 1 is not flattened (e.g., based on a user-selected option) in FIG. 5B, the logic of internal instance 1 is not included by the cone-of-influence 530 of EF1. As a result, a user can define fine-grain failure modes with respect to internal instance 1 using EP3, EP4, and EP5.

The following Table 2 illustrates example mappings between elementary functions (EF1, EF2, EF3, EF4, and EF5) and failure modes (FM1, FM2, FM3, FM4, FM5, FM6, and FM7) for the current instance 500B. In Table 2, failure modes FM3, FM4, FM5 can represent failure modes mapped to the internal_instance_1 partition.

TABLE 2

| Failure Modes | Targets |
| --- | --- |
| FM1 | EF1, internal_instance_2 |
| FM2 | EF2 |
| FM3 | EF3 |
| FM4 | EF4 |
| FM5 | EF5 |
| FM6 | internal_instance_3 |
| FM7 | internal_instance_4 |

Figure 6:
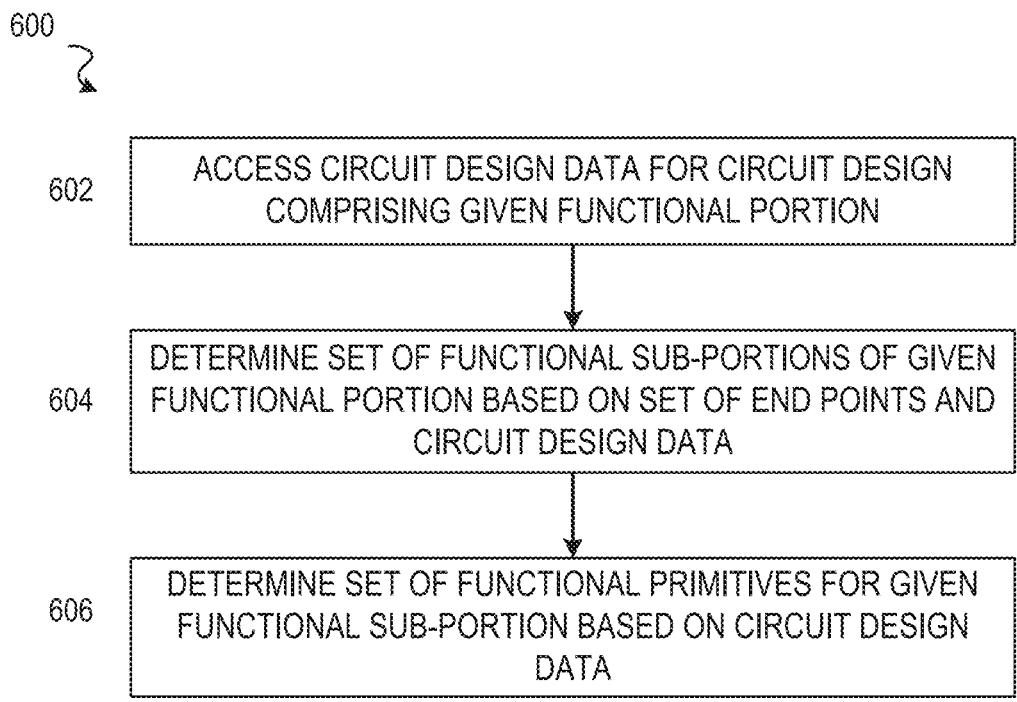
FIGS. 6 and 7 are flowcharts illustrating example methods for failure mode analysis, according to some embodiments.
Figure 7:
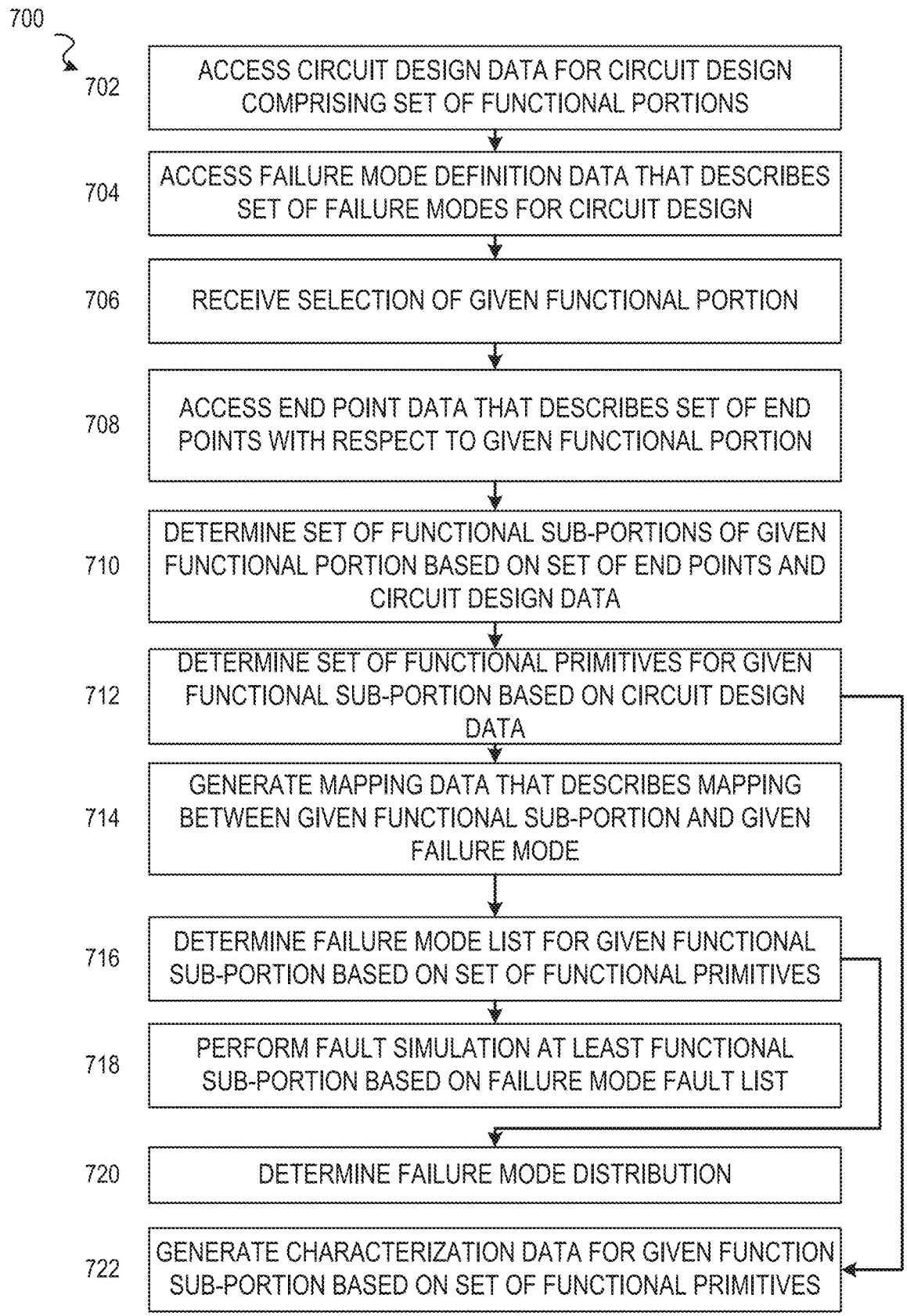

FIGS. 6 and 7 are flowcharts illustrating example methods for failure mode analysis, according to some embodiments. It will be understood that example methods described herein may be performed by a device, such as a computing device executing instructions of an EDA software system', in accordance with some embodiments. Additionally, example methods described herein may be implemented in the form of executable instructions stored on a computer-readable medium or in the form of electronic circuitry. For instance, the operations of a method 600 of FIG. 6 may be represented by executable instructions that, when executed by a processor of a computing device, cause the computing device to perform the method 600. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel. An operation of the method 600 (or another method described herein) may be performed by a hardware processor (e.g., central processing unit or graphics processing unit) of a computing device (e.g., desktop, server, etc.).

Referring now to FIG. 6, the method 600 as illustrated begins with operation 602 accessing circuit design data for a circuit design that comprises a given functional portion (e.g., instance or block of the circuit design). For some embodiments, the given functional portion comprises at least one of a part or a sub-part (of the circuit design) in accordance with a functional safety standard (e.g., ISO 26262). As described herein, the circuit design data can comprise architectural information (e.g., hierarchical information) for a circuit design, a list of instances (e.g., flip-flops) of a circuit design, areas of instances of a circuit design, number of flip-flops of a circuit design, a list of pins for a circuit design, a gate-level netlist for a circuit design, and cell library data. The given functional portion can be one selected by a user as a current functional portion (e.g., current instance) to be failure mode analyzed in accordance with various embodiments described herein. To select the given functional portion, the user may recognize they have a failure mode (e.g., "Wrong value due to fault in counter") and that the given functional portion (e.g., counter in the circuit design) is a root cause of the failure mode (e.g., responsible for activating the failure mode when the current functional portion is failing).

The method 600 continues with operation 604 determining a set of functional sub-portions (e.g., elementary functions) of the given functional portion based on the circuit design data and based on a set of end points defined with respect to the given functional portion. A functional sub-portion can comprise functional logic in front of the set of end points. A user can define (e.g., set) an end point with respect to a functional portion (e.g., instance or block) to designate where one or more functional sub-portions of the functional portion are to terminate. For some embodiments, a particular end point in the set of end points comprises at least one of a signal defined in language describing the circuit design, a variable defined in language describing the circuit design, a pin of the circuit design, or a flip-flop of the circuit design. Depending on the embodiment, a particular end point can be defined by a language (e.g., C, SystemC, or HDL), or at a register-transfer level (RTL) or at a gate level (GL) of the circuit design. Additionally, for some embodiments, the given functional sub-portion comprises an elementary function in accordance with a functional safety standard (e.g., ISO 26262). For instance, the elementary function can represent an elementary sub-part (of a sub-part of a circuit design) in accordance with ISO 26262.

The method 600 continues with operation 606 determining a set of functional primitives for a given functional sub-portion (of the set of functional sub-portions) based on the circuit design data (e.g., gate-level netlist information for the circuit design). For some embodiments, a functional primitive in the set of functional primitives comprises a cell, such as a gate or a flip-flop. As described herein, based on the determined set of functional primitives for the given functional sub-portion, some embodiments can generate characterization data for the given functional sub-portion, or a failure mode fault list for the given functional sub-portion. Some embodiments determine a set of functional primitives (e.g., gates or flip-flops) belonging to each functional sub-portion using the defined set of end points.

Referring now to FIG. 7, the method 700 as illustrated begins with operation 702, which according to some embodiments, is similar to operation 602 of the method 600 described above with respect to FIG. 6. The method 700 continues with operation 704 accessing failure mode definition data that describes a set of failure modes for a circuit design, such as one or more failure modes for a functional portion of the circuit design or for a functional sub-portion of the functional portion. A described herein, a failure mode can comprise a textual sentence representing a way in which a functional portion/functional sub-portion might fails when exposed to a fault. One or more of the failure modes can be defined for a circuit design by a user as part of performing failure mode analysis on the circuit design.

The method 700 continues with operation 706 receiving a selection (e.g., user selection via a GUI) of a given functional portion as a current functional portion being failure mode analyzed as described herein. The given functional portion can be selected by a user from a set of functional portions of the circuit design.

The method 700 continues with operation 708 accessing end point data that describes a set of end points with respect to the given functional portion of the circuit design (selected by operation 706). As described herein, a user can define (e.g., set) an end point with respect to a functional portion (e.g., instance or block) to designate where one or more functional sub-portions of the functional portion are to terminate. For some embodiments, a particular end point in the set of end points comprises at least one of a pin or a flip-flop of the circuit design. Depending on the embodiment, a particular end point can be defined by a language (e.g., C, SystemC, or HDL), or at a register-transfer level (RTL) or at a gate level (GL) of the circuit design.

The method 700 continues with operations 710 and 712, which according to some embodiments, are similar to operations 604 and 606 of the method 600 as described above with respect to FIG. 6.

The method 700 continues with operation 714 generating mapping data that describes a mapping between the given functional sub-portion (determined by operation 710) and a particular failure mode in the set of failure modes (accessed by operation 702). For example, a user can define (e.g., by way of user input) a mapping between each functional sub-portion and one or more failure modes in the set of failure modes. In doing so, a user can determine a root cause logic (e.g., functional sub-portion) a root cause logic model approximation responsible for each failure mode. The user can map a function portion/functional sub-portion and a failure mode, for example, by a tool command, a script, a database entry, or a graphical user interface.

The method 700 continues with operation 716 determining a failure mode fault list for the given functional sub-portion based on the set of functional primitives (determined by operation 712) for the given functional sub-portion. A failure mode fault list can be determined for each functional sub-portion determined by operation 710. As described herein, a failure mode fault list of a functional sub-portion can comprise a list of signals for functional primitives (determined by operation 712).

The method 700 continues with operation 718 performing a fault simulation on at least the given functional sub-portion (or the entire circuit design) based on the failure mode fault list (determined by operation 716) for the given functional sub-portion. As described herein, a signal from the failure mode fault list (determined by operation 716) can be injected (by a fault injector of the fault simulation) to trigger a failure mode with respect to the given functional sub-portion.

The method 700 continues with operation 720 determining a failure mode distribution for the given functional portion based on the mapping data (generated by operation 714) and the failure mode fault list (determined by operation 716). As described herein, the failure mode distribution can normalize the weight of a given failure mode of a given functional portion compared to other failure modes of the given functional portion. An example failure mode distribution can comprise a ratio between the gates that associated with a specific failure mode (through a mapping to a specific functional sub-portion) divided by total numbers of gates of the functional portion containing the functional sub-portion.

The method 700 continues with operation 722 generating characterization data for the given functional sub-portion based on the set of functional primitives (determined by operation 712) of the given functional sub-portion. For some embodiments, the characterization data comprises at least one of a flip-flop count or area of the functional portion (e.g., instance or block) occupied by gates of the functional sub-portion (e.g., elementary function).

Figure 8:
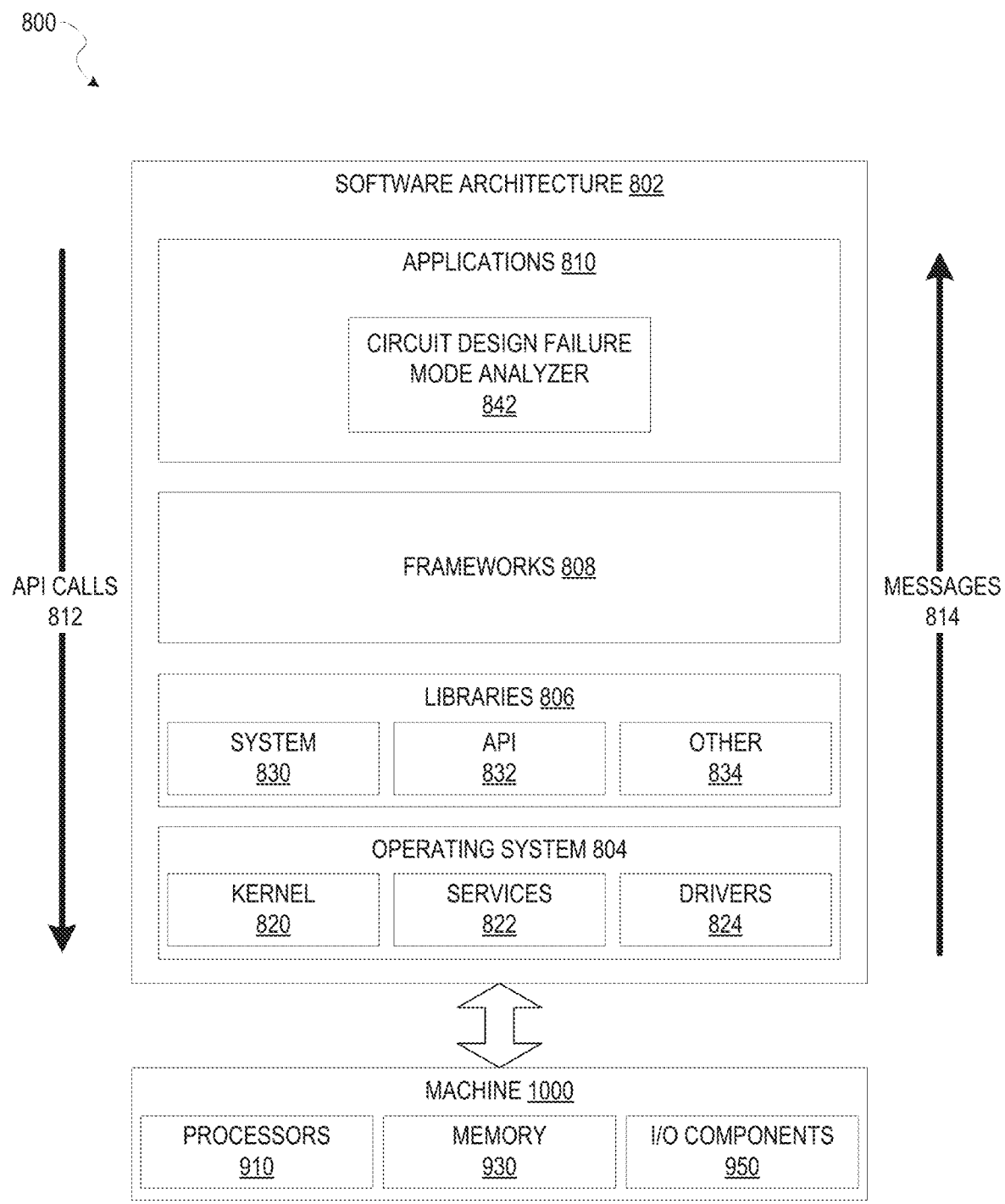
FIG. 8 is a block diagram illustrating an example of a software architecture that may be operating on an electronic design automation (EDA) computing device and may be used with methods for failure mode analysis, according to some embodiments.

FIG. 8 is a block diagram 800 illustrating an example of a software architecture 802 that may be operating on an EDA computer and may be used with methods for failure mode analysis, according to some embodiments. The software architecture 802 can be used as an EDA computing device to implement any of the methods described above. Aspects of the software architecture 802 may, in various embodiments, be used to store circuit designs, and to facilitate generation of a circuit design in an EDA environment, from which physical devices may be generated.

FIG. 8 is merely a non-limiting example of a software architecture 802, and it will be appreciated that many other architectures can be implemented to facilitate the functionality described herein. In various embodiments, the software architecture 802 is implemented by hardware such as a machine 900 of FIG. 9 that includes processors 910, memory 930, and I/O components 950. In this example, the software architecture 802 can be conceptualized as a stack of layers where each layer may provide a particular functionality. For example, the software architecture 802 includes layers such as an operating system 804, libraries 806, software frameworks 808, and applications 810. Operationally, the applications 810 invoke application programming interface (API) calls 812 through the software stack and receive messages 814 in response to the API calls 812, consistent with some embodiments. In various embodiments, any client device, any server computer of a server system, or any other device described herein may operate using elements of the software architecture 802. An EDA computing device described herein may additionally be implemented using aspects of the software architecture 802, with the software architecture 802 adapted for operating to perform failure mode analysis in a manner described herein.

In some embodiments, an EDA application of the applications 810 performs failure mode analysis according to embodiments described herein using various modules within the software architecture 802. For example, in some embodiments, an EDA computing device similar to the machine 900 includes the memory 930 and the one or more processors 910. The processors 910 also implement a circuit design failure mode analyzer 842 for failure mode analysis, in accordance with various embodiments described herein.

In various other embodiments, rather than being implemented as modules of the one or more applications 810, the circuit design failure mode analyzer 842 may be implemented using elements of the libraries 806, the operating system 804, or the software frameworks 808.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 806 provide a low-level common infrastructure utilized by the applications 810. The libraries 806 can include system libraries 830 such as libraries of blocks for use in an EDA environment or other libraries that can provide functions such as memory allocation functions, string manipulation functions, mathematic functions, and the like. In addition, the libraries 806 can include API libraries 832 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 may also include other libraries 834.

The software frameworks 808 provide a high-level common infrastructure that can be utilized by the applications 810, according to some embodiments. For example, the software frameworks 808 provide various graphic user interface (GUI) functions, high-level resource management, high-level location services, and so forth. The software frameworks 808 can provide a broad spectrum of other APIs that can be utilized by the applications 810, some of which may be specific to a particular operating system 804 or platform. In various embodiments, the systems, methods, devices, and instructions described herein may use various files, macros, libraries, and other elements of an EDA design environment to implement failure mode analysis as described herein. This includes analysis of input design files for an integrated circuit design, along with any element of hierarchical analysis that may be used as part of or along with the embodiments described herein. While netlist files, library files, SDC files, and view definition files are examples that may operate within the software architecture 802, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 900 including processors 910), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 900, but also deployed across a number of machines 900. In some embodiments, the processors 910 or processor-implemented modules are located in a single geographic location (e.g., within a home environment, an office environment, or a server farm). In some other embodiments, the processors or processor-implemented modules are distributed across a number of geographic locations.

Figure 9:
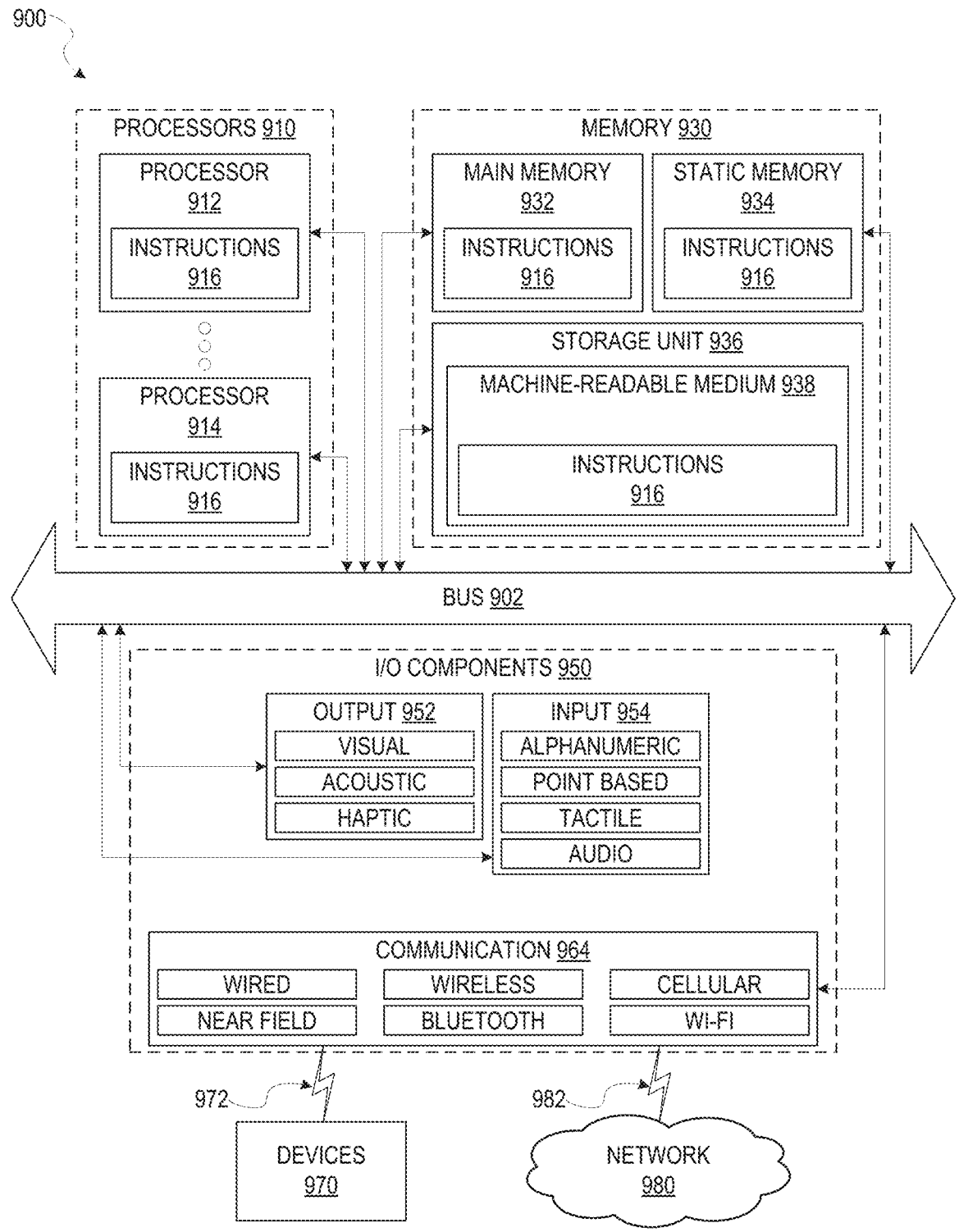
FIG. 9 is a diagram representing a machine in the form of a computer system within which a set of instructions are executed, causing the machine to perform any one or more of the methods discussed herein, according to some embodiments.

FIG. 9 is a diagrammatic representation of the machine 900 in the form of a computer system within which a set of instructions may be executed for causing the machine 900 to perform any one or more of the methodologies discussed herein, according to some embodiments. FIG. 9 shows components of the machine 900, which is, according to some embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

In various embodiments, the machine 900 comprises processors 910, memory 930, and I/O components 950, which can be configured to communicate with each other via a bus 902. In some embodiments, the processors 910 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 912 and a processor 914 that may execute the instructions 916. The term "processor" is intended to include multi-core processors 910 that may comprise two or more independent processors 912, 914 (also referred to as "cores") that can execute the instructions 916 contemporaneously. Although FIG. 9 shows multiple processors 910, the machine 900 may include a single processor 912 with a single core, a single processor 912 with multiple cores (e.g., a multi-core processor 912), multiple processors 910 with a single core, multiple processors 910 with multiple cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any one or more of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown, in some embodiments, to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., the instructions 916) for execution by a machine (e.g., the machine 900), such that the instructions, when executed by one or more processors of the machine (e.g., the processors 910), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 9. The I/O components 950 are grouped according to functionality merely for simplifying the following discussion, and the grouping is in no way limiting. In various embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. As described herein, "constraints," "requirements," "design elements," and other aspects of a circuit design refer to selectable values that are set as part of the design of a circuit. Such design constraints, requirements, or elements may be adjusted by a system operator or circuit designer to suit the particular goals of a project or circuit that results from the operations described herein.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, the communication components 964 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 970 may be another machine or any of a wide variety of peripheral devices (e.g., a peripheral device coupled via a USB).

In various embodiments, one or more portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling.

Furthermore, the machine-readable medium 938 is non-transitory (in other words, not having any transitory signals) in that it does not embody a propagating signal. However, labeling the machine-readable medium 938 "non-transitory" should not be construed to mean that the machine-readable medium 938 is incapable of movement; the machine-readable medium 938 should be considered as being transportable from one physical location to another. Additionally, since the machine-readable medium 938 is tangible, the machine-readable medium 938 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Although an overview of the inventive subject matter has been described with reference to some embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:
1. A method comprising:
accessing, by a hardware processor, circuit design data for a circuit design, the circuit design comprising a given functional portion;
accessing, by the hardware processor, failure mode definition data that describes a set of failure modes for the circuit design;
accessing, by the hardware processor, end point data that describes a set of end points with respect to the given functional portion of the circuit design;

determining, by the hardware processor, a set of functional sub-portions of the given functional portion based on the set of end points and the circuit design data;

determining, by the hardware processor, a set of functional primitives for a given functional sub-portion in the set of functional sub-portions based on the circuit design data;

determining, by the hardware processor, a failure mode fault list for the given functional sub-portion based on the set of functional primitives for the given functional sub-portion; and performing, by the hardware processor, a fault simulation on at least the given functional sub-portion of the circuit design based on the failure mode fault list for the given functional sub-portion, a fault injector of the fault simulation being configured to inject at least one signal from the failure mode fault list to trigger a failure mode.

2. The method of claim 1, further comprising:
generating, by the hardware processor, mapping data that describes a mapping between the given functional sub-portion and a given failure mode in the set of failure modes; and
determining, by the hardware processor, a failure mode distribution for the given functional portion based on the mapping data and the failure mode fault list.

3. The method of claim 1, further comprising:
generating, by the hardware processor, characterization data for the given functional sub-portion based on the set of functional primitives of the given functional sub-portion.

4. The method of claim 3, wherein the characterization data comprises a flip-flop count.

5. The method of claim 3, wherein the characterization data comprises area of the given functional portion occupied by gates of the given functional sub-portion.

6. The method of claim 1, wherein a functional primitive in the set of functional primitives comprises at least one of a gate or a flip-flop.

7. The method of claim 1, wherein a given end point in the set of end points comprises at least one of a signal defined in language describing the circuit design, a variable defined in language describing the circuit design, a pin of the circuit design, or a flip-flop of the circuit design.

8. The method of claim 1, wherein the given functional portion comprises at least one of a part or a sub-part in accordance with a functional safety standard.

9. The method of claim 1, wherein each functional sub-portion in the set of functional sub-portions comprises an elementary function in accordance with a functional safety standard.

10. The method of claim 1, further comprising:
generating, by the hardware processor, mapping data that describes a mapping between the given functional sub-portion and a given failure mode in the set of failure modes.

11. The method of claim 10, wherein the mapping data is generated based on user input.

12. The method of claim 1, further comprising:
accessing, by the hardware processor, mapping data that describes a mapping between the given functional portion and a given failure mode in the set of failure modes.

13. The method of claim 12, wherein the mapping data is generated based on user input.

14. The method of claim 1, further comprising:
generating, by the hardware processor, the end point data based on user input.

15. The method of claim 1, wherein a given end point of the set of end points is defined at a register-transfer level (RTL).

16. The method of claim 1, wherein a given end point of the set of end points is defined at a gate level (GL).

17. A device comprising:
a memory storing instructions; and
a hardware processor communicatively coupled to the memory and configured by the instructions to perform operations comprising:
accessing circuit design data for a circuit design;
accessing failure mode definition data that describes a set of failure modes for the circuit design;
receiving a first user input that selects a given functional portion of the circuit design;
receiving a second user input that defines a set of end points with respect to the given functional portion;
determining a set of functional sub-portions of the given functional portion based on the set of end points and the circuit design data;
determining a set of functional primitives for a given functional sub-portion in the set of functional sub-portions based on the circuit design data;
determining a failure mode fault list for the given functional sub-portion based on the set of functional primitives for the given functional sub-portion; and
performing a fault simulation on at least the given functional sub-portion of the circuit design based on the failure mode fault list for the given functional sub-portion, a fault injector of the fault simulation being configured to inject at least one signal from the failure mode fault list to trigger a failure mode.

18. A non-transitory computer-readable medium comprising instructions that, when executed by a hardware processor of a device, cause the device to perform operations comprising:
accessing circuit design data for a circuit design, the circuit design comprising a given functional portion;
determining a set of functional sub-portions of the given functional portion based on a set of end points and the circuit design data, the set of end points being defined with respect to the given functional portion of the circuit design;
determining a set of functional primitives for a given functional sub-portion in the set of functional sub-portions based on the circuit design data; and
generating mapping data that describes a mapping between the given functional sub-portion and a given failure mode in a set of failure modes for the circuit design.

19. The non-transitory computer-readable medium of claim 18, wherein the operations comprise:
determining a failure mode fault list for the given functional sub-portion based on the set of functional primitives for the given functional sub-portion; and
performing a fault simulation on at least the given functional sub-portion of the circuit design based on the failure mode fault list for the given functional sub-portion, a fault injector of the fault simulation being configured to inject at least one signal from the failure mode fault list to trigger a failure mode.

20. The non-transitory computer-readable medium of claim 19, wherein the operations comprise:
- generating, by the hardware processor, mapping data that describes a mapping between the given functional sub-portion and a given failure mode in the set of failure modes; and
- determining, by the hardware processor, a failure mode distribution for the given functional portion based on the mapping data and the failure mode fault list.

* * * * *